United States Patent [19]
Albertson

[11] 3,824,537
[45] July 16, 1974

[54] ANTI-EVASION SYSTEM FOR VEHICLE UNSUPERVISED BREATH TESTERS

[75] Inventor: Clarence E. Albertson, Villa Park, Ill.

[73] Assignee: Borg-Warner Corporation, Chicago, Ill.

[22] Filed: May 25, 1972

[21] Appl. No.: 257,030

[52] U.S. Cl............. 340/53, 340/279, 73/421.5 R, 180/99
[51] Int. Cl. .......................................... G08b 21/00
[58] Field of Search........ 340/52 R, 53, 237 R, 279; 128/2 C; 73/421.5 R

[56] References Cited
UNITED STATES PATENTS

| | | |
|---|---|---|
| 3,186,508 | 6/1965 | Lamont.......................... 340/279 X |
| 3,238,783 | 3/1966 | Wright........................... 73/421.5 R |
| 3,566,387 | 2/1971 | Schoener et al..................... 340/279 |
| 3,690,838 | 9/1972 | Luckey........................... 73/421.5 R |

*Primary Examiner*—Alvin H. Waring
*Attorney, Agent, or Firm*—Donald W. Banner

[57] ABSTRACT

A system for discouraging attempts at evasion of an unsupervised vehicle operator breath tester employing a free hand station (e.g. pushbutton on dash) which must be activated during a test period. In one embodiment this station directly allows the test to be completed and in another embodiment it does so indirectly using the transmittal of a signal from the station to the breath input unit through the user to allow passing of the test. Absence of such a signal indicates that the user is not contacting both the station and breath input and may be attempting to avoid the test.

4 Claims, 3 Drawing Figures

ANTI-EVASION SYSTEM FOR VEHICLE UNSUPERVISED BREATH TESTERS

CROSS-REFERENCE TO RELATED APPLICATION

The present invention is of particular utility with and is an improvement over the breath tester disclosed and claimed in co-pending U.S. Patent application Ser. No. 136,921, entitled VEHICLE BREATH TESTING SYSTEM filed on Apr. 23, 1971, in the names of D. W. Collier, J. P. Hoppesch and A. C. Mamo and assigned to the same assignee as is the present invention.

BACKGROUND OF THE INVENTION

The general background is given in the aforementioned Collier, et al. application.

The present invention is directed to defeating or discouraging attempts to evade testers such as the Collier et al. tester by means of a bag of air, bellows, or, in some cases, by a substitute subject.

SUMMARY OF THE INVENTION

In accord with the present invention a system for the discouraging of evasion of such testers comprises at least a remote free hand station (such as a pushbutton) located away from the breath input unit by an arms reach. The second hand station is so intercoupled to the tester that absence of activation thereof aborts the test or prevents the passage of the test.

In a vehicle, the station is positioned on the dash, open to view through the windshield.

In a simplified version of the invention (as described hereafter) the station is simply required to be activated (as by closing the pushbutton switch) during the test. In a more complicated second version the station is activated by means of the transmittal of a safe low voltage and low power signal between hand and breath input.

The features of the present invention which are believed to be novel are set forth with particularity in the appended claims. The invention, together with the further advantages thereof, may best be understood by reference to the following description taken in connection with the accompanying drawings, in the several figures of which like reference numerals identify like elements.

DESCRIPTIVE INCORPORATION BY REFERENCE

The description and drawing of the aforementioned Collier et al. application Ser. No. 136,921, are under the practice approved by the Commissioner of Patents in 34 Federal Register 833 hereby incorporated by reference as if here set out. That system may function and be so constructed as there set forth with the additions and modification hereinafter to be detailed.

DETAILED DESCRIPTION

Figure 1:
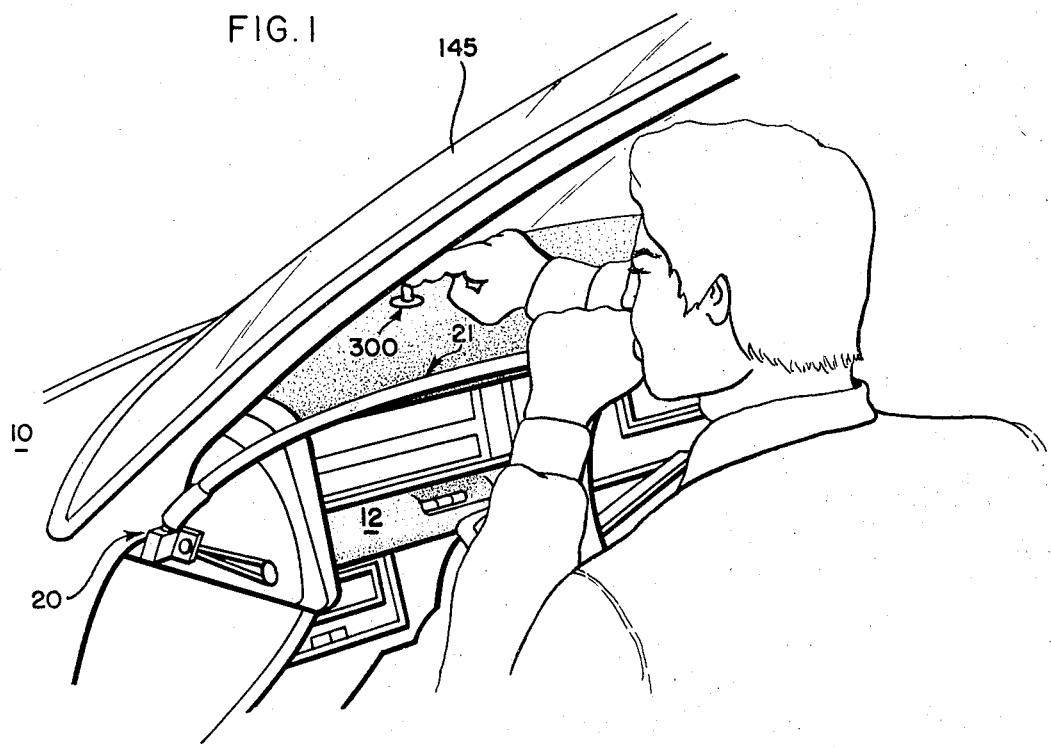
FIG. 1 is a perspective view of an automobile incorporating the inventive system, together with a driver illustrating the operation of the system.

In FIG. 1 hereof, a vehicle 10 equipped with a breath tester 20 having a breath input unit 21 of the Collier et al. type further includes, in accordance with the present invention, a station 300 hereinafter referred to as a free hand station located on the upper dash 12 at a position remote from the input unit 21 and positioned so as to be readily seen through the windshield and 145 in FIG. 1 by someone (e.g. a chance-passing policeman) outside of the vehicle 10. The free hand station 300 is remote enough so as to substantially occupy the left arm and hand of the subject so as to make it difficult or impossible for him to employ a bag or bellows or the like when his free hand is in the position shown.

Figure 2:
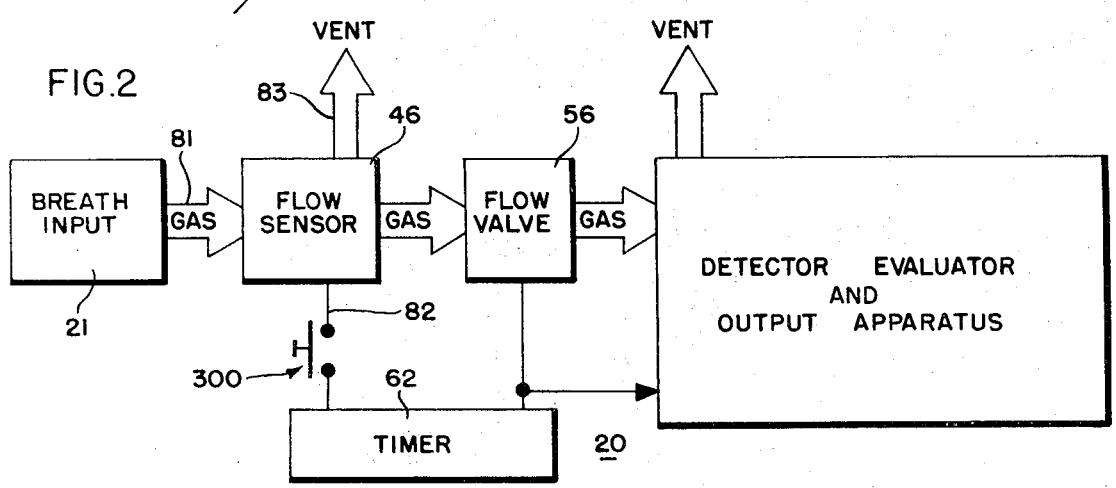
FIG. 2 is a combined circuit and block diagram of one embodiment of the invention of FIG. 1.

In one embodiment the station 300 may comprise a single pushbutton switch, such as that shown at 300 in FIG. 2, connected on the signal line 82 between the flow sensor 46 and the timer 62 of the unit 20. The details of the unit 20 are described in the incorporated-by-reference material. It is sufficient to understand that if the signal on line 82 is interrupted before the timer 62 has run, the timer is reset and no "pass" signal can be obtained. Thus the switch 300 must be closed during the period or no "pass" signal may be obtained.

Figure 3:
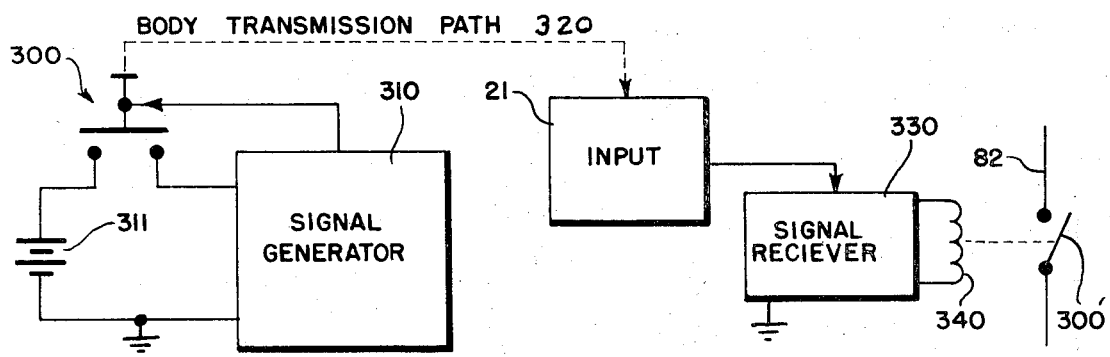
FIG. 3 is a block diagram of a second embodiment of the invention.

In FIG. 3, an alternative embodiment is disclosed wherein the switch 300 operates a low voltage, low power, direct current or alternating current signal source 310 (by connecting the power source 311 to it). The signal generator or source 310 transfers (as by direct conductance or capacitance coupling) the signal over the subject's arm and body (indicated as path 320 in FIG. 3) to an input 21 which has a receiver 330 coupled to it. The receiver 330 operates, e.g. by means of a relay 340, a switch 300' in the line 82. Thus, unless the button 300 is pushed and a signal path is established between it and input 21, no pass signal may be obtained. The signal generator 310 could be a tapped resistance element (potentiometer) across the car battery to put a small D.C. voltage on the switch button, when it is pressed. Alternately, the signal generator could be a 1,000 cycle audio-frequency oscillator, such as the transistor oscillator, Circuit 5–10, page 5–31 of the book: "Selected Semiconductor Circuits Handbook" by S. Schwartz, J. Wiley, 1960.

Receiver 330 could be a transistor, D.C. current amplifier which operates a control relay, see Circuit 2–3, page 2–20 of the reference book. This detector would pick up the signal from the D.C. battery source at 310.

Alternately, a low level audio amplifier could be used to detect the 1,000 cycle A.C. signal. A suitable audio amplifier-relay circuit is shown as Circuit 3–1, page 3–23 of the Schwartz text. This circuit can be tuned by insertion of a tank circuit in place of $R_4$ so it would only respond to the 1,000 cycle signal, and not to other spurious A.C. signals.

Naturally, the receiver 330 and sender 310 are electrically shielded to prevent an accidental path from being established between them.

The arrangement of FIG. 3 makes difficult the activation of the free hand station 300 and the breath sample by different people and defeats avoidance by simply placing a weight on the switch 300. In many cases the chance of detection because of its ready visibility would be sufficient deterent for the simpler system of FIG. 2.

As should now be apparent a new and improved system has been described that provides greater security against evasion.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a motor vehicle equipped with a breath tester of the type designed to be used by the driver of the motor vehicle, and also of the type that affects the operation of the vehicle unless and until the breath test is taken and passed, and which tester requires the user thereof to blow breath into an input thereof, said vehicle also having a dash easily visible from the outside of the vehicle, the improvement of an anti-evasion system comprising:

a free hand station positioned remotely from the breath input and adapted to be activated by a free hand of the driver; and means, responsive to the activation of the free hand station, to allow the breath tester to be successfully operated but to prevent the passing of the test in the absence of the activation of said station, in which said means includes a signal generator for producing signals in response to the activation of said station, and a receiver for said signals of said signal generator, said receiver including means for allowing a pass output from said tester in response to the reception of said signals of said generator, said generator and receiver being positioned to employ a subject's body as a transmission media.

2. The invention of claim 1, wherein said signal generator produces electrical signals as said signals.

3. The invention of claim 2, wherein said electrical signals are low voltage, low power, direct current electrical signals.

4. The invention of claim 2, wherein said electrical signals are an audio frequency alternating current, low voltage, low power, electrical signals.

* * * * *